United States Patent [19]

Eisenkopf et al.

[11] 3,972,621

[45] Aug. 3, 1976

[54] APPARATUS FOR STABILIZING A LINE OF SIGHT

[75] Inventors: Hermann Eisenkopf, Naunheim; Ludwig Leitz, Wetzlar, both of Germany

[73] Assignee: Ernst Leitz G.m.b.H.

[22] Filed: Oct. 22, 1974

[21] Appl. No.: 516,956

Related U.S. Application Data

[63] Continuation of Ser. No. 323,376, Jan. 15, 1973, abandoned.

[30] Foreign Application Priority Data

Jan. 18, 1972 Germany.............................. 2202175

[52] U.S. Cl............................. 356/152; 250/203 R; 351/7
[51] Int. Cl.²......................................... G01B 11/26
[58] Field of Search ............ 356/152, 28, 167, 170, 356/156; 250/203 R; 351/7

[56] References Cited
UNITED STATES PATENTS

| | | | |
|---|---|---|---|
| 3,244,889 | 4/1966 | Preston et al.................. | 250/203 R |
| 3,482,107 | 12/1969 | Hock................................. | 250/237 |
| 3,724,932 | 4/1973 | Cornsweet....................... | 351/7 |
| 3,768,022 | 10/1973 | Lang................................ | 325/163 |
| 3,806,725 | 4/1974 | Leitz............................... | 250/203 R |

FOREIGN PATENTS OR APPLICATIONS 1,249,302 10/1971 United Kingdom.................. 356/28

*Primary Examiner*—Maynard R. Wilbur
*Assistant Examiner*—S. C. Buczinski
*Attorney, Agent, or Firm*—Gilbert L. Wells

[57] ABSTRACT

Means for stabilizing the line of sight between an object and an optical viewing system which can move relative to each other, characterized in that electrical signals are derived with the aid of an optical grating (3',3'') as a correlator, which signals correspond to the deviation from the line of sight (4) with respect to magnitude, direction, and arithmetic symbol; and that these signals are fed to a follower system (11,12) such as disclosed in L. M. Biberman: Reticles in Electro-Optical Devices, Pergamon Press, 1966, p. 45 which displaces the line of sight (4) until the original condition has been restored and the deviation has become zero again.

8 Claims, 3 Drawing Figures

U.S. Patent  Aug. 3, 1976  3,972,621
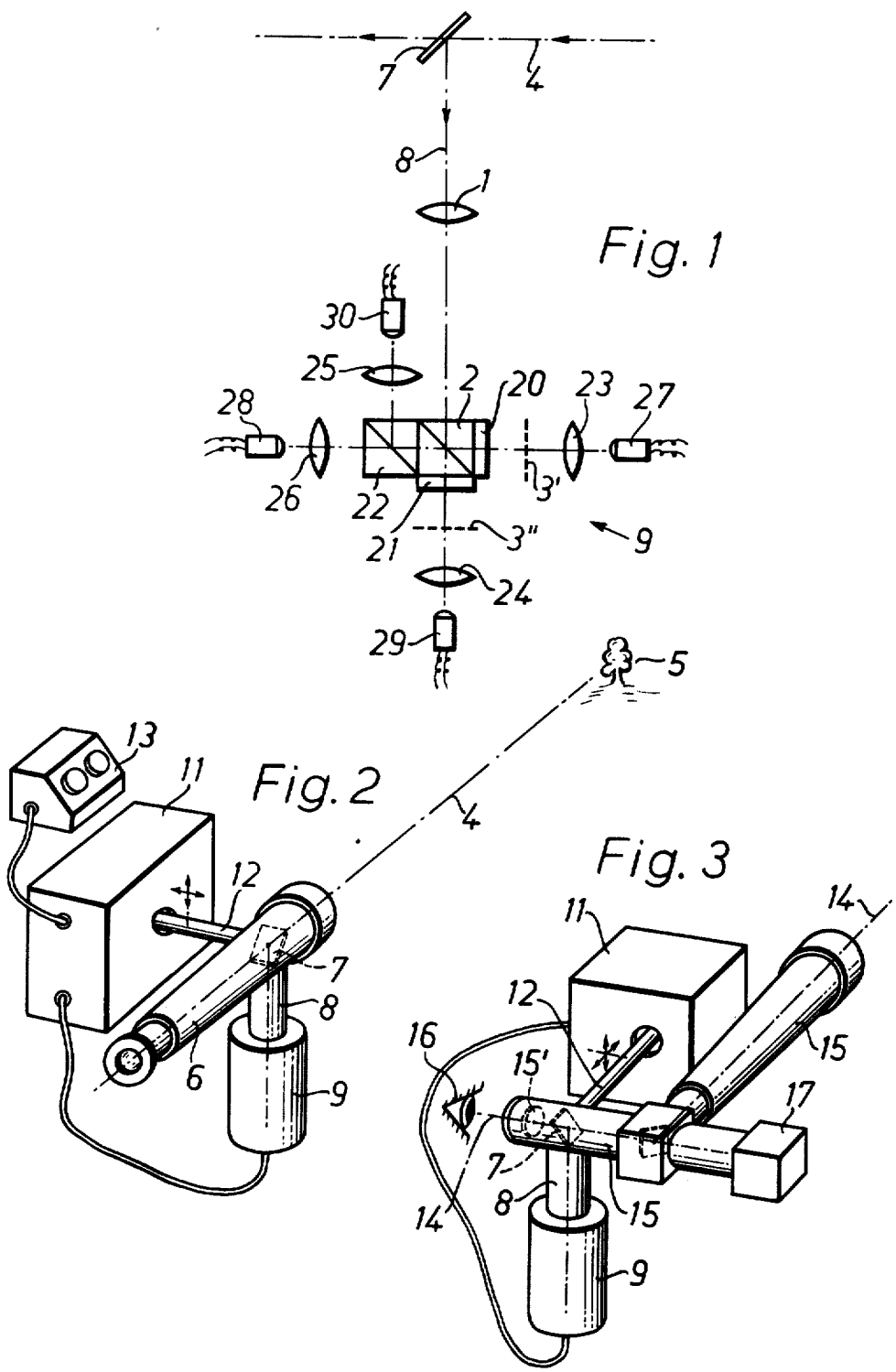

3,972,621

APPARATUS FOR STABILIZING A LINE OF SIGHT

This is a continuation of application Ser. No. 323,376, filed Jan. 15, 1973, now abandoned.

CROSS REFERENCES TO RELATED APPLICATIONS

Applicants claim priority under 35 U.S.C. 119 for application Ser. No. P 22 02 175.6, filed Jan. 18, 1972, in the Patent Office of the Federal Republic of Germany. The priority document is contained in the file of application Ser. No. 323,376.

The following U.S. Pat. applications, of the assignee of the present invention, are incorporated by reference:

Ser. No. 283,967, of Heitmann et al., filed Aug. 28, 1972, now abandoned, and having the title "Apparatus for No-Contact Measurement";

Ser. No. 314,395 of Lang, filed Dec. 12, 1972, now U.S. Pat. No. 3,833,299, and having the title "Apparatus for No-Contact Measurement of the Velocity, the Path or the Range of Objects"; and Ser. No. 323,343 of Leitz, filed Jan. 15, 1973, now U.S. Pat. No. 3,806,725, and having the title "Apparatus For Automatic Tracking of Pupil of Eye".

BACKGROUND OF THE INVENTION

The present invention is related to means for the stabilization of the line of sight between an object and an optical viewing system, which move relative to one another.

It is conventional to stabilize systems by producing, first of all, with the aid of the gyroscopic principle, a space-bound rotational reference system and, with the aid of detected values of path length, velocity, or acceleration, a space-bound translational reference system. Deviations are determined in the positions of the devices from these reference systems; and the original position is restored by means of control elements.

When such a device consists, for example, of a viewing instrument, translational movements can be neglected. In such a case, a triaxial angular stabilization with gyroscopes is sufficient. These principles exhibit the disadvantage, on the one hand, that the frequency range of around $f = o$ is obtained only asymptotically, for example, in case of a sinusoidal angular movement of the observer with respect to the object, due to gyroscopic errors. A further disadvantage is the space-bound stabilization, since this does not cover the movement of the object relative to space. In many practical cases, it is only important for stabilizing purposes that a specific axis, e.g. the line of sight of a telescope, the position of which is determined by the device to be stabilized, i.e. by the observer, always pass through the object of interest.

A further problem in an optical viewing apparatus used in vehicles which are subjected to strongly varying accelerations resides for the observer, in that the pupil of the observer's eye must be kept within the exit pupil of the optical system. Attempts have been made to solve this problem by enlarging the exit pupil, and transmission to projection screens or even television screens. Also optical joints have been suggested. The aforementioned principles have the disadvantage that a practicable solution can be obtained only at considerable expenditure. Furthermore, there is no non-contactual direct coupling between the variable relative positions of the pupil of the eye and of the exit pupil.

SUMMARY OF THE INVENTION

Having in mind the limitations of the prior art, it is an object of the present invention to stabilize the line of sight between an object and an optical viewing system, without expensive inertia stabilizers, to control directly the viewing system by the position of the object, and to avoid the disadvantages of the prior art described above.

These objects are achieved, according to the present invention, by deriving electrical signals with the aid of an optical grating as a correlator, for example according to U.S. patent application Ser. No. 283,967 or according to U.S. Pat. No. 3,833,299, which signals correspond to the deviation from the line of sight with respect to magnitude, direction, and arithmetic symbol, and by feeding these signals to a follow-up system such as disclosed in L. M. Biberman: *Recticles in Electro-Optical Devices* Pergamon Press, 1966, p. 45 which displaces the line of sight until the original condition has been restored and the deviation has been reduced preferably to zero. From the adjustment variable of the follower system, measured values can be derived regarding the magnitude, direction and/or velocity of the relative movement. The novel process is advantageously employed, so that the line of sight which is between a part of an observer's face, as the object, and the exit pupil of an optical viewing system is stabilized.

The special advantage of the present invention resides in that less expenditure in apparatus, cost and time is required for conducting same.

BRIEF DESCRIPTION OF THE DRAWINGS

Embodiments of devices for conducting the present invention are described hereinbelow with reference to schematic views of the drawings, to wit:

FIG. 1 is a schematic plan view showing a device for scanning two gratings to perform a two-coordinate measurement;

FIG. 2 is a perspective view illustrating a device of the present invention for stabilizing the line of sight between an object and an optical viewing system using the device of FIG. 1; and FIG. 3 is a perspective view showing a device of the present invention using the device of FIG. 1 for stabilizing the line of sight between an optical instrument and part of the face of the observer using this optical instrument.

DESCRIPTION OF THE PREFERRED EMBODIMENTS

In the device of FIG. 1, illustrated schematically as an example for a measuring head, an objective 1 reproduces an object, not shown, on two gratings 3', 3'' via a polarizing beam splitter 2. These gratings are formed so that reflecting markers are provided on a transparent carrier. The portions of the beam penetrating the gratings 3', 3'' pass, via condenser lenses 23, 24, to photoelectric receivers 27, 29. The portions of the beam reflected from the markers of the gratings are fed, via the beam splitter 2, another polarizing beam splitter 22, as well as condensers 25, 26, to photoelectric receivers 28, 30. As can be seen from the drawing, respectively one quarter-wave plate 20, 21 is inserted between the beam splitter 2 and the gratings 3', 3'', so that the polarization characteristics of the beam portions reflected from the gratings are exactly transposed with respect to the incident beam portions. By means of this arrangement, in a low-loss manner, equally strong push-pull signals are obtained at the outputs of the pairs of receivers 27, 28, and 29, 30, from the portions of the object image respectively reflected from and transmitted by the gratings 3', 3''. These push-pull signals are correlated with the coordinate directions. With a firm relative position of the object and the pairs of photoelectric receivers, the push-pull signals have a repetition rate which is only proportional to the motion velocity of a (preferably defined) movement of the gratings in their planes. In contrast thereto, when the object is moving, repetition rates are obtained which, depending on the direction of motion of the object, are proportional either to the sum or to the difference of the object and grating velocities in the respective coordinate directions. By comparison with signals only derived from the movements of the gratings, the magnitude and direction of the object movement can be determined from these signals in a conventional manner, for example by means of phase-sensitive rectifiers as comparison stages.

If the location is to be measured, the number of periods traversed are counted at the outputs of the comparison stages, taking into account the directional information which is likewise available.

In FIG. 2, the line of sight to be stabilized is denoted by 4. This line connects an object 5 with a viewing optic 6. By means of a beam splitter 7 disposed in this optical viewing system 6, a portion 8 is branched off from the beam for controlling an optical correlator 9, for example according to FIG. 1. This correlator is connected with an adjusting mechanism 11 as disclosed in L. M. Biberman: *Reticles*, p. 45 coupled therewith. The latter moves the optical viewing system 6, via a control arm 12, until the line of sight 4 extends again between the optical viewing system 6 and the object 5. An apparatus 13 serves for indicating measured values derived from the adjusted variable of the mechanism 11, with respect to magnitude, direction and/or velocity of the relative motion of the object 5 with regard to the optical viewing system 6.

The modification illustrated schematically in FIG. 3 serves for stabilizing the line of sight 14 between an optical instrument 15 and the eye 16 of an observer. In this case, an infrared radiation source 17 is provided which is fixedly connected with the instrument 15 and illuminates the eye 16 in such a manner that it is imaged via a beam splitter 7 into an optical correlator 9. The evaluation of the output signals of the correlator 9 is effected in the same manner as the device described in connection with FIG. 2, and the resetting of the ocular 15' is such that the pupil of the instrument 15 is always opposite the observer's eye, so that the pupil of the instrument is congruent with the pupil of the eye. This is important for viewing from moving vehicles.

In the embodiment shown in FIG. 2, the incident beam paths for the viewing instrument and for the correlator are intertwined. In order to avoid a loss of light intensity for visual observation, it is then advantageous to employ differing spectral ranges for observation purposes and for the correlator.

Finally, it is to be noted that the arrangement can also be chosen so that differently impinging light beams are applied to the viewing mechanism and the correlation means, for example by disposing the correlation means laterally of the viewing objective and rigidly connected to the latter.

We claim:

1. An apparatus for stabilizing the line of sight between an object and an optical viewing system which move relative to one another comprising:
   an optical grating (3',3'') to receive light from said line of sight (4) and to optically correlate a spatial frequency component present in an extended image structure of said object (5, 16);
   electrical generating means (27 - 30) responsive to the light received from said grating to generate electrical signals proportional to the magnitude and direction of any relative movement of said optical axis of said line of sight (4) and said object (5, 16); and
   means (11) responsive to said electrical signals to actuate means (12) for displacing said optical viewing system so as to counteract the relative deviation movement.

2. The apparatus of claim 1, wherein said object is a part of the face of an observer.

3. The apparatus of claim 2, wherein said part of the face of an observer is the eye of an observer viewing said viewing system.

4. An apparatus for stabilizing the line of sight between an object and an optical viewing system which move relative to one another comprising:
   an optical viewing system (6) located along said line of sight (4) and having an optical axis;
   means (7) located in said optical viewing system (6) for deflecting an extended image of said object (5, 16);
   means (9) including optical gratings (3',3'') to receive light from said line of sight (4) for optically correlating the position of said extended image relative to said optical axis and generating signals proportional to the deviation of said optical axis from said line of sight (4) towards said object (5, 16) with respect to magnitude, direction and sign; and
   means (11, 12) for displacing said optical viewing system into said line of sight actuated by said signals proportional to the deviation.

5. The apparatus of claim 7, wherein said means for optically correlating include a polarizing beam splitter 2) receiving said reflected image and projecting a first polarized split image to a first grating (3) having a transparent carrier and reflecting markers, and a second polarized split image to a second grating (3'') having a transparent carrier and reflecting markers, said gratings projecting said polarized split image to first and second photoelectric receivers (27, 29) and said reflecting markers reflecting said split images to third and fourth photoelectric receiver (28, 30), said photoelectric receivers generating said signals proportional to the deviation.

6. An apparatus for stabilizing the line of sight between an eye of an observer and an optical viewing system which move relative to one another comprising:
   an optical viewing system (6) located along the line of sight (4) and having an optical axis;
   means (7) located in said optical viewing system (6) for deflecting an image of said eye (16);
   means (9) including optical gratings (3', 3'') to receive light from said line of sight (4) for optically correlating the position of said image relative to said optical axis and generating signals proportional to the deviation of said optical axis from said line of sight (4) towards said eye (16) with respect to magnitude, direction and sign; and means (11, 12) for displacing said optical viewing system into said line of sight (4) actuated by said signals proportional to the deviation.

7. The apparatus of claim 6, having an infrared radiation source along said optical axis illuminating said eye to reflect said image.

8. The apparatus of claim 6, wherein said means for optically correlating include a polarizing beam splitter (2) receiving said deflected image and projecting a first polarized split image to a first grating (3') having a transparent carrier and reflecting markers and a second polarized split image to a second grating (3'') having a transparent carrier and reflecting markers, said gratings projecting said polarized split images to first and second photoelectric receivers (27, 29) and said reflecting markers reflecting said split images to third and fourth photoelectric receivers (28, 30), said photoelectric receivers generating said signals proportional to the deviation.

* * * * *